US012619173B2

(12) United States Patent
Kitamura et al.

(10) Patent No.: US 12,619,173 B2
(45) Date of Patent: May 5, 2026

(54) SHUTTER UNIT, TONER STORAGE CONTAINER, AND IMAGE FORMING APPARATUS

(71) Applicants: Gen Kitamura, Kanagawa (JP); Junji Yamabe, Kanagawa (JP); Seiji Terazawa, Kanagawa (JP); Shuntaroh Tamaki, Kanagawa (JP)

(72) Inventors: Gen Kitamura, Kanagawa (JP); Junji Yamabe, Kanagawa (JP); Seiji Terazawa, Kanagawa (JP); Shuntaroh Tamaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/861,223

(22) PCT Filed: May 23, 2023

(86) PCT No.: PCT/IB2023/055262
§ 371 (c)(1),
(2) Date: Oct. 29, 2024

(87) PCT Pub. No.: WO2023/233238
PCT Pub. Date: Dec. 7, 2023

(65) Prior Publication Data

US 2025/0284224 A1 Sep. 11, 2025

(30) Foreign Application Priority Data

May 28, 2022 (JP) ................................ 2022-087286

(51) Int. Cl.
*G03G 15/08* (2006.01)

(52) U.S. Cl.
CPC ....... *G03G 15/0886* (2013.01); *G03G 15/087* (2013.01); *G03G 15/0872* (2013.01);
(Continued)

(58) Field of Classification Search
CPC ............. G03G 15/087; G03G 15/0879; G03G 15/0872; G03G 15/0886;
(Continued)

(56) References Cited

U.S. PATENT DOCUMENTS

2014/0270859 A1 9/2014 Hosokawa et al.
2014/0348551 A1* 11/2014 Yamabe ............. G03G 15/0872 399/263
(Continued)

FOREIGN PATENT DOCUMENTS

CN 210052018 U 2/2020
JP 2006-276571 A 10/2006
(Continued)

OTHER PUBLICATIONS

International Search Report and Written Opinion issued on Oct. 2, 2023 in PCT/IB2023/055262 filed on May 23, 2023, 9 pages.
(Continued)

*Primary Examiner* — Robert B Beatty
(74) *Attorney, Agent, or Firm* — XSENSUS LLP

(57) ABSTRACT

A shutter unit to be installed in a toner container attachable to and detachable from an apparatus body of an image forming apparatus includes: a shutter to be pushed by a nozzle disposed in the apparatus body, with movement of the container in an insertion direction into the apparatus body, to insert the nozzle into the container and communicate the nozzle and the container via an opening of the nozzle; a shutter holder holding the shutter movable in the insertion direction; a seal to contact a circumferential surface of the shutter in a closed state and slide on the circumferential surfaces of the shutter and the nozzle during an opening operation in which the shutter is pressed by the nozzle; and a seal holder detachably holding the seal at an inner portion
(Continued)

of the seal holder. The shutter holder and the seal holder are integrated in a detachable manner.

20 Claims, 7 Drawing Sheets

(52) U.S. Cl.
CPC . *G03G 15/0879* (2013.01); *G03G 2215/0665* (2013.01); *G03G 2215/067* (2013.01); *G03G 2215/0692* (2013.01)

(58) Field of Classification Search
CPC ... G03G 2215/0663; G03G 2215/0665; G03G 2215/0668; G03G 2215/0692; G03G 2215/067
USPC .................................................. 399/106, 262
See application file for complete search history.

(56) References Cited

U.S. PATENT DOCUMENTS

| | | | | |
|---|---|---|---|---|
| 2016/0070204 | A1* | 3/2016 | Suzuki | G03G 15/0886 399/258 |
| 2017/0139350 | A1* | 5/2017 | Yano | G03G 15/0872 |
| 2020/0192243 | A1 | 6/2020 | Kitamura et al. | |
| 2020/0264537 | A1 | 8/2020 | Kikuchi et al. | |
| 2021/0116839 | A1 | 4/2021 | Hosokawa et al. | |
| 2021/0116840 | A1 | 4/2021 | Hosokawa et al. | |
| 2021/0132524 | A1 | 5/2021 | Kikuchi et al. | |
| 2021/0349411 | A1 | 11/2021 | Hosokawa et al. | |
| 2021/0364947 | A1 | 11/2021 | Hosokawa et al. | |
| 2021/0405553 | A1 | 12/2021 | Hosokawa et al. | |
| 2022/0244661 | A1 | 8/2022 | Hosokawa et al. | |
| 2022/0317592 | A1 | 10/2022 | Kitamura | |
| 2023/0280674 | A1 | 9/2023 | Hideki et al. | |

FOREIGN PATENT DOCUMENTS

| | | | | |
|---|---|---|---|---|
| JP | 2014-112120 | A | 6/2014 | |
| JP | 2015-179233 | A | 10/2015 | |
| JP | 2016-018003 | A | 2/2016 | |
| JP | 2016-057509 | A | 4/2016 | |
| JP | 2022-080152 | A | 5/2022 | |
| WO | 00/001976 | A1 | 1/2000 | |
| WO | 2022/058833 | A1 | 3/2022 | |
| WO | WO-2022106945 | A1 * | 5/2022 | G03G 15/0898 |

OTHER PUBLICATIONS

Office Action issued Feb. 13, 2026 in Japanese Patent Application No. 2022-087286, 10 pages.

* cited by examiner

SHUTTER UNIT, TONER STORAGE CONTAINER, AND IMAGE FORMING APPARATUS

TECHNICAL FIELD

Embodiments of the present disclosure relate to a shutter unit disposed in a toner container, a toner container including the shutter unit, and an image forming apparatus such as a copier, a printer, a facsimile, or a multifunction peripheral thereof.

BACKGROUND ART

Image forming apparatuses such as copiers and printers are widely known in which a cylindrical toner container (i.e., a powder container) is detachably installed (e.g., see PTL 1).

For example, the toner container (powder storage container) in PTL 1 is provided with a shutter (container shutter). The shutter is pushed by a nozzle disposed in an apparatus body of an image forming apparatus, in conjunction with attachment of toner container to the body of the image forming apparatus. When the shutter is pushed by the nozzle, the nozzle is inserted into the toner container as it is. The nozzle and the toner container communicate with each other through an opening (i.e., a nozzle opening) formed on the peripheral surface of the nozzle. In this way, the toner stored inside the toner container is ready to be discharged to the outside through the nozzle. In such a toner container, a container body that stores toner inside is rotatably engaged with a shutter unit (nozzle receiving member) that is non-rotatably held by the apparatus body of the image forming apparatus. In the shutter unit, a shutter is movably held. A doughnut-shaped seal (container seal) is stuck to an inner peripheral portion of the shutter unit to prevent toner from leaking from the inner peripheral portion (through hole) of the shutter unit in which the nozzle and the shutter are inserted.

CITATION LIST

Patent Literature

PTL 1
Japanese Patent No. 5435380

SUMMARY OF INVENTION

Problem to be Solved

When an operation is performed for recycling (reusing) a used toner container collected from a market, such a seal stuck to the shutter unit may be difficult to remove. Since a used seal has severe deterioration such as abrasion compared with other components and is difficult to reuse as it is, the seal is replaced with au unused one in the recycling operation. However, the seal stuck to the shutter unit may be difficult to remove, which causes the recycling operation to be difficult and troublesome.

In order to solve the problem as described above, an object of the present disclosure is to provide a shutter unit, a toner container, and an image forming apparatus in which a seal can be easily removed.

Solution to Problem

According to an aspect of the disclosure, a shutter unit is to be installed in a toner container that is attachable to and detachable from an apparatus body of an image forming apparatus. The shutter unit includes a shutter, a shutter holder, a seal, and a seal holder. The shutter is pushed by a nozzle disposed in the apparatus body, in conjunction with movement of the toner container in an insertion direction into the apparatus body, to insert the nozzle into the toner container and to communicate the nozzle and the toner container with each other via an opening on a circumferential surface of the nozzle. The shutter holder holds the shutter movable in the insertion direction. The seal contacts a circumferential surface of the shutter in a closed state in which the seal is not pressed by the nozzle. The seal slides on the circumferential surface of the shutter and the circumferential surface of the nozzle during an opening operation in which the shutter is pressed by the nozzle. The seal holder detachably holds the seal at an inner portion of the seal holder. The shutter holder and the seal holder are integrated in a detachable manner.

Advantageous Effects of Invention

According to one or more embodiments of the present disclosure, a shutter unit, a toner container, and an image forming apparatus can be provided in which a seal can be easily removed.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
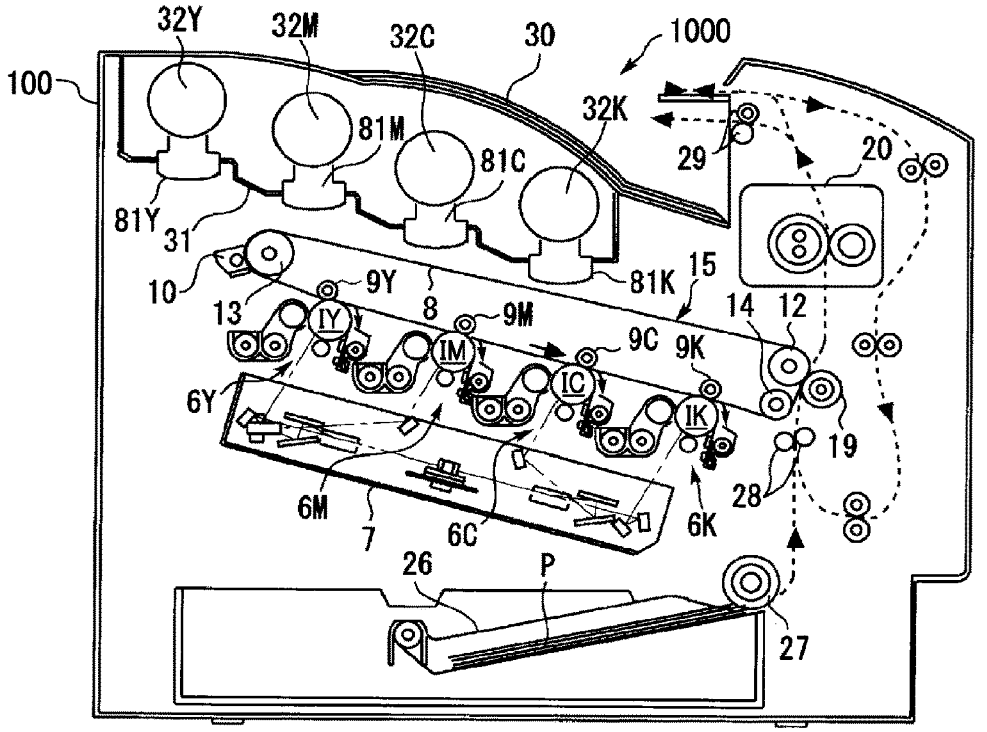
FIG. 1 is a diagram illustrating an overall configuration of an image forming apparatus according to an embodiment of the present disclosure.

Embodiments of the present disclosure are described below in detail with reference to the drawings. Identical reference numerals are assigned to identical or equivalent components and a description of those components may be simplified or omitted.

Figure 2:
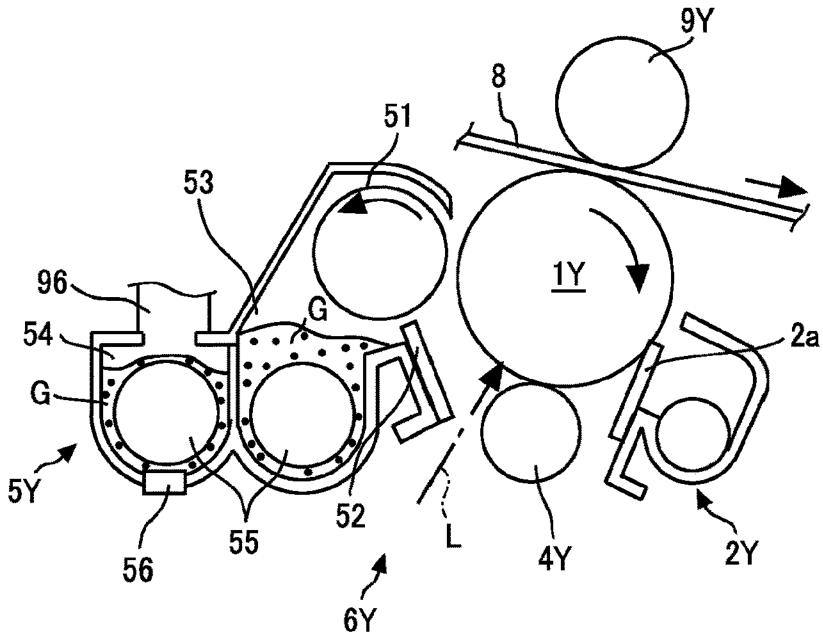
FIG. 2 is a cross-sectional view of an image forming device of the image forming apparatus of FIG. 1.
Figure 3:
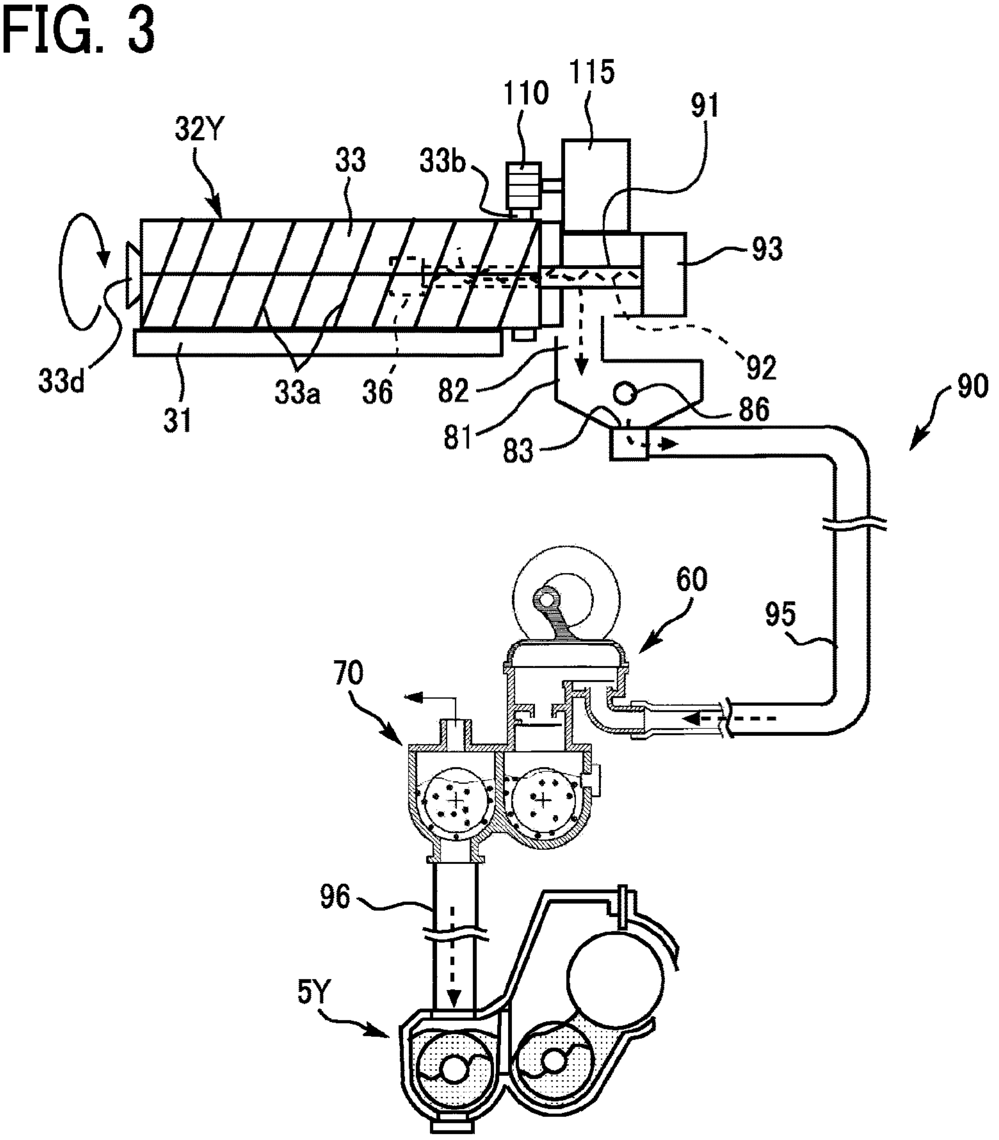
FIG. 3 is a schematic view of a toner supply device of the image forming apparatus of FIG. 1 and the vicinity thereof.

With reference to FIGS. 1 to 3, an overall configuration and operation of an image forming apparatus 1000 according to an embodiment of the present disclosure are described below. FIG. 1 is a schematic view of the image forming apparatus 1000 illustrated as a printer. FIG. 2 is an enlarged view of an image forming device of the image forming apparatus 1000. FIG. 3 is a schematic view of a toner supply device and the vicinity thereof.

As illustrated in FIG. 1, an apparatus body 100 of the image forming apparatus 1000 includes an installation section 31 (serving as a toner container rack) in which substantially cylindrical toner containers 32Y, 32M, 32C, and 32K are detachably attached. In other words, the four toner containers 32Y, 32M, 32C, and 32K correspond to four colors of yellow, magenta, cyan, and black, respectively. Hoppers 81Y, 81M, 81C, and 81K of toner supply devices are disposed below the toner containers 32Y, 32M, 32C, and 32K, respectively.

An intermediate transfer unit 15 is disposed below the installation section 31. Image forming devices 6Y, 6M, 6C, and 6K corresponding to colors of yellow, magenta, cyan, and black, respectively, are arranged side by side to face an intermediate transfer belt 8 of the intermediate transfer unit 15.

With reference to FIG. 2, the image forming device 6Y for yellow includes a photoconductor drum 1Y (serving as an image bearer), a charging device 4Y, a developing device 5Y, a cleaning device 2Y, and a discharging device that are disposed around the photoconductor drum 1Y. Image forming processes (i.e., charging process, exposure process, development process, transfer process, cleaning process, and charge eliminating process) are executed on the photoconductor drum 1Y. Thus, a yellow toner image is formed on the surface of the photoconductor drum 1Y.

The other three image forming devices 6M, 6C, and 6K also have almost the same configuration as the image forming device 6Y corresponding to yellow, except a configuration that the toner colors used are different. Thus, only the image forming device 6Y is described below and descriptions of other image forming devices 6M, 6C, and 6K are omitted.

As illustrated in FIG. 2, the photoconductor drum 1Y is driven to rotate clockwise in FIG. 2 by a motor. The charging device 4Y uniformly charges the surface of the photoconductor drum 1Y (a charging process).

When the surface of the photoconductor drum 1Y reaches a position at which the surface of the photoconductor drum 1Y is irradiated with laser beam L emitted from an exposure device 7 (a writing device, see FIG. 1), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, the electrostatic latent image is developed with toner into a yellow toner image (a development process).

When the surface of the photoconductor drum 1Y bearing the toner image reaches a position facing a primary transfer roller 9Y via the intermediate transfer belt 8, the toner image on the photoconductor drum 1Y is transferred onto the intermediate transfer belt 8 (primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (a cleaning process).

Finally, the surface of the photoconductor drum 1Y reaches a position facing the discharging device, and the discharging device removes residual potentials from the photoconductor drum 1Y.

Thus, a series of image forming processes performed on the surface of the photoconductor drum 1Y is completed.

The other image forming devices 6M, 6C, and 6K execute the series of image forming processes described above in substantially same manner as the image forming device 6Y. In other words, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Specifically, in the exposure device 7, a light source emits the laser beam L, which is deflected by a polygon mirror rotated. The laser beam L then reaches the photoconductor drum 1 via multiple optical elements. Thus, the exposure device 7 scans the surface of each of the photoconductor drums 1M, 1C, and 1K with the laser beam L.

Then, the toner images formed on the photoconductor drums 1M, 1C, and 1K through the development process are transferred and superimposed on the intermediate transfer belt 8. Thus, a color toner image is formed on the intermediate transfer belt 8.

The intermediate transfer unit 15 includes the intermediate transfer belt 8, the four primary transfer rollers 9Y, 9M, 9C, and 9K, a secondary transfer backup roller 12, a cleaning backup roller 13, a tension roller 14, and an intermediate transfer belt cleaning device 10. The intermediate transfer belt 8 is stretched around and supported by the three rollers (i.e., the secondary transfer backup roller 12, the cleaning backup roller 13, and the tension roller 14), and is rotated in the direction indicated by arrow illustrated in FIG. 1 as one of the multiple rollers that serves as a drive roller rotates (i.e., the secondary transfer backup roller 12).

The four primary transfer rollers 9Y, 9M, 9C, and 9K sandwich the intermediate transfer belt 8 together with the four photoconductor drums 1Y, 1M, 1C, and 1K, respectively, thus forming the four primary transfer nips between the intermediate transfer belt 8 and the photoconductor drums 1Y, 1M, 1C, and 1K. A primary transfer bias opposite in polarity to the toner is applied to the primary transfer rollers 9Y, 9M, 9C, and 9K.

The intermediate transfer belt 8 is moved in the direction indicated by arrow in FIG. 1 and sequentially passes through the primary transfer nips formed by the primary transfer rollers 9Y, 9M, 9C, and 9K. Thus, the yellow, magenta, cyan, and black toner images on the photoconductor drums 1Y, 1M, 1C, and 1K are primarily transferred to and superimposed on the intermediate transfer belt 8, thereby forming a multicolor toner image.

Subsequently, the intermediate transfer belt 8 bearing the multicolor toner image reaches a position opposite a secondary transfer roller 19. At the position facing the secondary transfer roller 19, the secondary transfer backup roller 12 sandwiches the intermediate transfer belt 8 with the secondary transfer roller 19 to form a secondary transfer nip. The four-color toner images (i.e., yellow, magenta, cyan, and black) superimposed on the intermediate transfer belt 8 are secondarily transferred onto a sheet P (e.g., a paper) conveyed through the secondary transfer nip (a secondary transfer process). At this time, untransferred toner that has not been transferred onto the sheet P remains on the surface of the intermediate transfer belt 8.

The surface of the intermediate transfer belt 8 then reaches a position opposite the intermediate transfer cleaning device 10. At the position, the intermediate-transfer-belt cleaner collects the untransferred toner from the surface of the intermediate transfer belt 8. As a result, a series of transfer processes executed on the outer circumferential surface of the intermediate transfer belt 8 is completed.

The sheet P is conveyed from a sheet feeder 26 disposed in a lower portion of the apparatus body 100 of the image forming apparatus 1000 to the secondary transfer nip via a feed roller 27 and a registration roller pair 28.

Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 (serving as a timing roller pair) temporarily stops at the roller nip between the rollers of the registration roller pair 28 that has stopped driving to rotate. Subsequently, the registration roller pair 28 is rotated to convey the sheet P to a secondary transfer nip, timed to coincide with the arrival of the multicolor toner image on the intermediate transfer belt 8. As described above, the desired color toner image is transferred onto the sheet P.

Subsequently, the sheet P, onto which the multicolor image is transferred at the secondary transfer nip, is conveyed to a position of a fixing device 20. Then, at this position, the color toner image transferred to the surface of the sheet P is fixed on the sheet P by heat and pressure of the fixing roller and the pressure roller (a fixing process).

The sheet P is conveyed through the rollers of an output roller pair 29 and ejected to the outside of the image forming apparatus 1000. The sheets P ejected by the output roller pair 29 to the outside of the image forming apparatus 1000 are sequentially stacked as output images on a stack tray 30.

Thus, a series of image forming processes performed by the image forming apparatus 1000 is completed.

A detailed description is provided of a configuration and operations of the developing device as a supplied portion of the image forming unit with reference to FIG. 2.

The developing device 5Y includes a developing roller 51, a doctor blade 52, two conveying screws 55, and a toner sensor 56. The developing roller 51 faces the photoconductor drum 1Y. The doctor blade 52 faces the developing roller 51. The two conveying screws 55 are disposed within developer containers 53 and 54. The toner sensor 56 detects a concentration of toner in a developer G. The developing roller 51 includes stationary magnets therein, a sleeve that rotates around the magnets, and the like. The developer containers 53 and 54 contain the two-component developer G including carrier (i.e., carrier particles) and toner (i.e., toner particles).

The developing device 5Y described above operates as follows.

The sleeve of the developing roller 51 rotates in the direction indicated by an arrow in FIG. 2. The developer G is borne on the developing roller 51 by a magnetic field generated by the magnets. As the sleeve rotates, the developer G moves along the circumference of the developing roller 51.

The developer G in the developing device 5Y is adjusted so that the ratio of toner (i.e., toner concentration) in the developer G is within a predetermined range. Specifically, the toner supply device 90 (see FIG. 3) serving as a supply device that supplies toner from the toner container 32Y to the developer container 54 (see FIG. 2) according to the toner consumption in the developing device 5Y.

The toner supplied to the developer container 54 is stirred and mixed with the developer G and circulated through the two developer containers 53 and 54 by the two conveying screws 55 (i.e., in a longitudinal direction perpendicular to the surface of the paper on which FIG. 2 is illustrated). The toner in the developer is triboelectrically charged by friction with the carrier and electrostatically attracted to the carrier. Then, the toner is borne on the developing roller 51 together with the carrier by magnetic force generated on the developing roller 51.

The developer borne on the developing roller 51 is carried in a direction indicated by arrow in FIG. 2 to the doctor blade 52. The doctor blade 52 adjusts the amount of the developer borne on the developing roller 51 to an appropriate amount. The developer G on the developing roller 51 is conveyed to a position opposite the photoconductor drum 1Y (a developing area). The toner is attracted to the electrostatic latent image formed on the photoconductor drum 1Y by an electric field generated in the developing area.

Subsequently, as the sleeve rotates, the developer G remaining on the developing roller 51 reaches an upper portion of the developer container 53 and separates from the developing roller 51.

With reference to FIG. 3, a configuration and operations of the toner supply device 90 serving as the supply device is briefly described.

The toner supply device 90 rotationally drives a container body 33 of the toner container 32Y (i.e., a powder container) disposed in the installation section 31 in a predetermined direction (i.e., in the direction indicated by arrow in FIG. 3), discharges the toner contained in the toner container 32Y to the outside of the toner container 32Y, and guides the toner to the developing device 5Y as the supplied portion via a sub-hopper 70. The toner supply device 90 includes a toner supply path (i.e., a toner conveyance path).

To easily understand the configuration of the toner supply device 90, the toner container 32Y, the toner supply device 90, and the developing device 5Y are illustrated in FIG. 3 in different orientations from the actual arrangement. Actually, the longitudinal axes of the toner container 32Y and a part of the toner supply device 90 are perpendicular to the plane on which FIG. 3 is illustrated (see FIG. 1). In addition, the orientations and arrangement of conveying tubes 95 and 96 are also illustrated in a simplified manner.

The toner supply devices 90 supply the color toners contained in the toner containers 32Y, 32M, 32C, and 32K installed in the installation section 31 in the apparatus body 100 of the image forming apparatus 1000 to the corresponding developing devices 5Y, 5M, 5C, and 5K, respectively. The amount of toner supplied to each developing device 5 is determined based on the amount of toner consumed in the corresponding developing device 5. The four toner supply devices 90 have a similar configuration except the color of the toner used in the image forming processes.

For example, with reference to FIG. 3 (and FIGS. 5A to 5C), when the toner container 32Y is installed in the installation section 31 of the apparatus body 100, a shutter 36 of the toner container 32Y is pushed by a toner conveying nozzle 91 (nozzle) of the apparatus body 100, and the toner conveying nozzle 91 is inserted into the toner container 32Y (container body 33) via a through-hole portion 40*a*. Accordingly, the toner contained in the toner container 32Y can be discharged through the toner conveying nozzle 91.

The toner container 32Y includes a gripper 33*d* at the bottom portion (i.e., left in FIG. 3) of the toner container 32Y so that an operator easily handles and installs the toner container 32Y in the installation section 31. The gripper 33*d* has an outer diameter smaller than an outer diameter of the container body 33. The operator grips the gripper 33*d* to install the toner container 32Y in the installation section 31 and take out the toner container 32Y from the installation section 31.

Referring to FIG. 3, the toner container 32Y includes the container body 33 having a spiral groove 33*a* extending in the longitudinal direction (i.e., the left and right direction in FIG. 3) and the axial direction of the container body 33. Specifically, the spiral groove 33*a* is formed from an outer circumferential surface toward an inner circumferential surface of the container body 33 so that a rotation of the container body 33 convey the toner in the container body 33 from the left to the right in FIG. 3. The toner conveyed from the left to the right in FIG. 3 inside the container body 33 is discharged to the outside of the toner container 32Y through the toner conveying nozzle 91.

A gear 33*b* that meshes with the drive gear 110 of the apparatus body 100 is formed on an outer peripheral surface of the container body 33 on a head side (right side in FIG. 3) of the container body 33. When the toner container 32Y is attached to the installation section 31, the gear 33*b* of the container body 33 meshes with the drive gear 110 of the apparatus body 100. As a drive motor 115 is driven, the driving force is transmitted from the drive gear 110 to the gear 33*b*, thus driving the container body 33 to rotate. The drive motor 115 and the drive gear 110 function as a driver to rotate the container body 33.

A configuration and operation of the toner container 32Y are described in further detail later.

With reference to FIG. 3, a conveying screw 92 is disposed inside the toner conveying nozzle 91. As a motor 93 rotates the conveying screw 92, the conveying screw 92 conveys the toner flowing into the toner conveying nozzle 91 from an opening 91*a* (i.e., inflow port, see FIGS. 5A to 5C) in the toner container 32Y from the left to the right in FIG. 3. Thus, the toner is discharged through an outlet of the toner conveying nozzle 91 to the hopper 81. The hopper 81 is disposed below the outlet of the toner conveying nozzle 91 via a dropping path 82. The toner stored in the hopper 81 is conveyed to the developing device 5 downstream from the hopper 81 by a conveyor. The conveyance configuration by the conveyor in FIG. 3 is illustrated below.

A suction port 83 is disposed in the bottom of the hopper 81 and coupled to one end of the conveying tube 95 as a tube. The conveying tube 95 is made of a flexible rubber material with low affinity for toner, and the other end of the conveying tube 95 is coupled to a developer pump 60 (i.e., a diaphragm pump). The developer pump 60 is coupled to the developing device 5Y via the sub-hopper 70 and the conveying tube 96.

In the toner supply device 90 with such a configuration, the drive motor 115 as the driver rotates the container body 33 of the toner container 32Y to discharge the toner stored in the toner container 32Y to the outside of the toner container 32Y through the toner conveying nozzle 91. The toner discharged from the toner container 32Y falls through the dropping path 82 and is stored in the hopper 81. The developer pump 60 operates to suck the toner stored in the hopper 81 together with air from the suction port 83 and convey the toner from the developer pump 60 to the sub-hopper 70 through the conveying tube 95. The toner conveyed to and stored in the sub-hopper 70 is appropriately supplied into the developing device 5Y via the conveying tube 96. In other words, the toner in the toner container 32Y is conveyed in the direction indicated by dashed arrows in FIG. 3.

The conveyor is not limited to the above-described configuration, and for example, the toner stored in the hopper 81 may be conveyed directly to the developing device 5Y by a screw disposed in the hopper 81.

A toner sensor 86 is disposed near the suction port 83 and indirectly detects a state in which the toner contained in the toner container 32Y is depleted (i.e., toner end state) or a state in which the toner contained in the toner container 32Y is nearly depleted (i.e., toner near end state). The toner is discharged from the toner container 32Y based on a detection result of the toner sensor 86.

For example, a piezoelectric sensor or a transmission optical sensor may be used as the toner sensor 86. The height of the detection surface of the toner sensor 86 is set so that the amount of toner (i.e., a deposition height) deposited above the suction port 83 is a target value.

A drive timing and a drive duration of the drive motor 115 are controlled to rotationally drive the toner container 32Y (container body 33) based on the detection result of the toner sensor 86. Specifically, when the toner sensor 86 detects that toner is not deposited on a detection position of the toner sensor 86, the drive motor 115 is driven for a predetermined time. When the toner sensor 86 detects that toner is present on the detection position, the drive motor 115 stops. If the toner sensor 86 continuously detects that toner does not exist at the detection position even when the above-described control is performed repeatedly, a controller of the image forming apparatus determines that the toner stored in the toner container 32Y is depleted (i.e., toner end state) or a state that the toner contained in the toner container 32Y is nearly depleted (i.e., toner near end state).

With reference to FIGS. 4, 5A, 5B, and 5C, a detailed description is provided of the toner containers 32Y, 32M, 32C, and 32K further in detail below.

FIGS. 4, 5A, 5B, and 5C are cross-sectional side views of the toner container 32Y. The drawings illustrate a side of the toner container 32Y opposite to the side illustrated in FIG. 3. The left and right of FIG. 3 are reversed in FIGS. 4, 5A, 5B, and 5C).

As described above with reference to FIGS. 1 to 3, the toner container 32Y stores toner therein and is detachably attached to the apparatus body 100.

Referring to FIGS. 4 to 7, the toner container 32Y includes the container body 33 and a shutter unit 34. The shutter unit 34 includes a shutter holder 35 and a seal holder 40. The shutter holder 35 includes, for example, the shutter 36, a rod 37, a compression spring 38, and a case 39. The seal holder 40 is a substantially cylindrical member, and a doughnut-shaped seal 41 is disposed in an inner peripheral portion 40*b*, which is a cavity including the through-hole portion 40*a*, of the seal holder 40. The container body 33 is rotatably fitting to the seal holder 40 and is a bottle with the spiral groove 33*a* formed on the inner peripheral surface (inner peripheral portion) of the container body 33.

When the toner container 32Y is attached to the apparatus body 100 (installation section 31), the container body 33 is rotated by the drive motor 115 (drive mechanism) disposed in the apparatus body 100, with the seal holder 40 (shutter unit 34) non-rotatably held in the installation section 31. The toner contained in the toner container 32Y is discharged via the toner conveying nozzle 91.

With reference to FIGS. 4 and 5A to 5C (and FIGS. 6A, 6B, and 7), the shutter 36 opens and closes the through-hole portion 40*a*, into which the toner conveying nozzle 91 (disposed in the apparatus body 100) is inserted, in conjunction with the operation of attaching the toner container 32Y to the apparatus body 100. The shutter 36 is made of a resin material and molded together with the rod 37, which is described below. The shutter 36 is engaged with the through-hole portion 40*a* from the inside of the container and locked so as not to detach to the outside of the container. Toner is not discharged to the outside of the toner container 32Y with the through-hole portion 40*a* closed by the shutter 36. Toner is discharged to the outside of the toner container 32Y with the through-hole portion 40*a* opened by the shutter 36. The through-hole portion 40*a* is a substantially cylindrical hole portion with the rotation center of the container body 33 being the center of the through-hole portion 40*a*. The shutter 36 is a stopper formed to fit with the through-hole portion 40*a* having such a shape.

The toner container 32Y includes a seal 41 to seal a gap between the shutter 36 and the through-hole portion 40*a* with the through-hole portion 40*a* being closed by the shutter 36. Specifically, the seal 41 is formed of an elastic material such as foamed polyurethane or felt, and is stuck to the entire circumferential surface of the inner peripheral portion 40*b* including the through-hole portion 40*a*. The seal 41 seals the gap between the shutter 36 and the through-hole portion 40*a* with the through-hole portion 40*a* closed by the shutter 36. The seal 41 seals the gap between the toner conveying nozzle 91 and the through-hole portion 40*a* so that the toner stored in the container body 33 does not leak from the through-hole portion 40*a* with the through-hole portion 40*a* opened by the shutter 36.

In the present embodiment, the length M of the seal 41 in the longitudinal direction of the seal 41 is longer than the length N of the opening 91*a* of the toner conveying nozzle 91 in the insertion direction.

The rod 37 is integrated with the shutter 36. The rod 37 extends in the opening and closing directions of the shutter 36 (i.e., the left and right directions in FIGS. 4, 5A, 5B, and 5C) inside the toner container 32Y.

Figure 4:
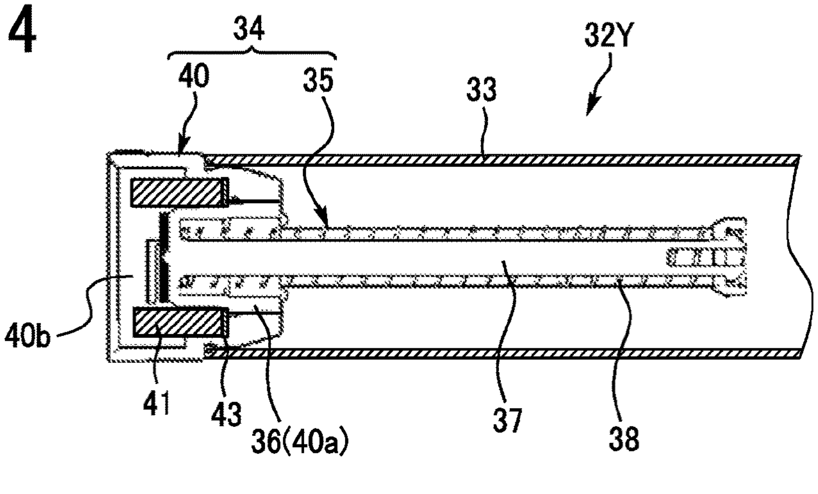
FIG. 4 is a cross-sectional view of a main part of a toner container.

As illustrated in FIG. 4, the rod 37 is disposed so that the axis of the rod 37 substantially coincides with the rotation center of the container body 33. Such a configuration reduces a failure such as a positional displacement of the shutter 36 when the container body 33 is driven to rotate.

With reference to FIGS. 4, 5A, 5B, and 5C, the toner container 32Y according to the present embodiment is detachably attached to the apparatus body 100 with the shutter unit 34 non-rotatably held by the apparatus body 100. In response to receipt of rotational driving force from the apparatus body 100, the container body 33 rotates around the toner conveying nozzle 91.

The seal holder 40 of the shutter unit 34 has a through-hole portion 40*a* extending in a direction in which the toner conveying nozzle 91 is inserted (an insertion direction, which is one of the left-and-right directions in FIGS. 4, 5A, 5B, and 5C).

The seal holder 40 has an inner peripheral portion 40*b* (cavity) that is open on the upstream side in a direction in which the toner conveying nozzle 91 is inserted (the upstream side in the insertion direction and the left side in FIGS. 4, 5A, 5B, and 5C) is formed. The inner peripheral portion 40*b* is a substantially cylindrical recess centering on the rotation center of the container body 33.

In the shutter unit 34, the case 39 of the shutter holder 35 holds the rod 37 on the opposite side (i.e., the right side in FIGS. 4, 5A, 5B, and 5C) to the side on which the shutter 36 is disposed inside the toner container 32Y so that the rod 37 be movable in the opening and closing directions. The case 39 is has a substantially U shape extending in the left and right directions of FIGS. 4, 5A, 5B, and 5C inside the toner container 32Y (i.e., the container body 33).

The compression spring 38 as a biasing member is wound around the rod 37 between the shutter 36 and a wall of the case 39. The compression spring 38 biases the shutter 36 in the direction to which the through-hole portion 40*a* is closed (i.e., toward the left side in FIGS. 4, 5A, 5B, and 5C).

In such a configuration, the shutter 36 is pushed by the toner conveying nozzle 91 in conjunction with the installation operation of the toner container 32Y to the apparatus body 100 (i.e., the installation section 31). The shutter 36 moves together with the rod 37 to the inside of the toner container 32Y against the biasing force of the compression spring 38 (i.e., the biasing member) and opens the through-hole portion 40*a*. Specifically, the shutter 36 (and the rod 37) moves in the order as illustrated in FIGS. 5A and 5B to open the through-hole portion 40*a*.

In contrast, removing the toner container 32Y from the apparatus body 100 (i.e., the installation section 31) causes the toner conveying nozzle 91 to release the shutter 36 from the above-described pushed state, and the biasing force of the compression spring 38 moves the shutter 36 together with the rod 37 toward the through-hole portion 40*a* to close the through-hole portion 40*a*. Specifically, the shutter 36 (and the rod 37) moves in the order as illustrated in FIGS. 5B and 5A to close the through-hole portion 40*a*.

Figure 5A:
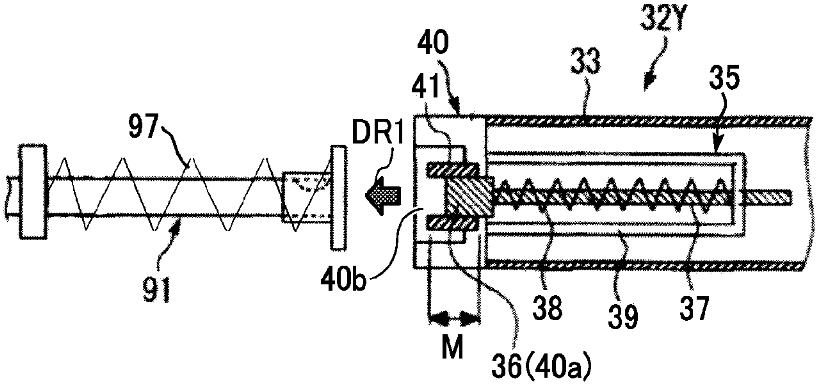
FIGS. 5A to 5C are schematic diagrams illustrating an attachment operation of a toner conveyance nozzle to the toner container.
Figure 5B:
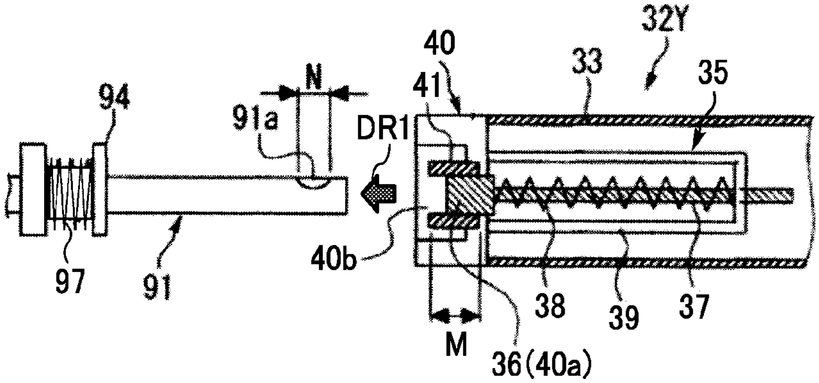

As illustrated in FIG. 5B, when the installation of the toner container 32Y in the apparatus body 100 is completed, the shutter 36 contacts the wall of the case 39, and the compression spring 38 is stored in the recess of the shutter 36. Such a configuration can prevent a problem that toner in the toner container 32Y adheres to the compression spring 38 when the toner container 32Y is installed in the apparatus body 100.

Figure 5C:
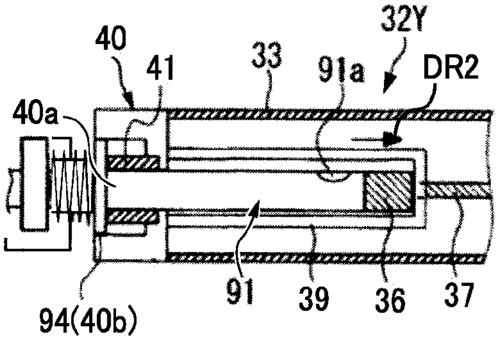

As illustrated in FIGS. 5A to 5C, the toner conveying nozzle 91 in the present embodiment has a fitting member 94 to fit the inner peripheral portion 40*b* in conjunction with the insertion operation of the toner conveying nozzle 91 to the through-hole portion 40*a*. Specifically, the fitting member 94 has an outer diameter larger than the outer diameter of a main portion of the toner conveying nozzle 91. The fitting member 94 has a substantially columnar shape to fit the inner peripheral portion 40*b* of the seal holder 40. The fitting member 94 is slidable along the main portion of the toner conveying nozzle 91 in the installation direction of the toner container 32Y indicated by arrow DR1 in FIGS. 5A and 5B. Additionally, a compression spring 97 is attached on the toner conveying nozzle 91 to bias the fitting member 94 downstream in the insertion direction, indicated by arrow DR2 in FIG. 5C, in which the toner conveying nozzle 91 is inserted into the toner container 32Y (i.e., toward the right side in FIGS. 5A to 5C). The fitting member 94 also functions as a cover that covers the opening 91*a* of the toner conveying nozzle 91. As illustrated in FIG. 5A, the fitting member 94 closes the opening 91*a* when the toner container 32Y is not installed. As illustrated in FIG. 5C, the fitting member 94 slides and moves, and the main portion of the toner conveying nozzle 91 is inserted to the inside of the container body 33 when the toner container 32Y is installed. In FIG. 5B, the fitting member 94 is slid, so that the opening 91*a* is exposed.

With such a configuration, when the toner conveying nozzle 91 is inserted into the toner container 32Y in conjunction with the installation operation of the toner container 32Y, the fitting member 94 is biased by the compression spring 97 to fit the inner peripheral portion 40*b*. In contrast, when the toner conveying nozzle 91 is pulled out from the toner container 32Y in conjunction with the detaching operation of the toner container 32Y, the fitting member 94 is pulled out from the inner peripheral portion 40*b*.

Referring to FIGS. 4, 5A, 5B, 5C, 6A, and 6B, a configuration and operation of the shutter unit 34 (of the toner container 32Y) in the present embodiment are described below.

As described above with reference to FIGS. 1 to 7, the toner container 32Y is detachably attached to the apparatus body 100 and includes the container body 33 and the shutter unit 34. The shutter unit 34 includes the shutter holder 35 and the seal holder 40 that are integrated as a single unit.

The shutter holder 35 is a member that holds the shutter 36 such that the shutter 36 is movable along an insertion direction (directions in which the shutter 36 is opened and closed and left-and-right directions in FIGS. 4, 8A, 8B, and 8C), and is provided with the rod 37, the compression spring 38, and the case 39 in addition to the shutter 36.

The shutter 36 is pushed by the toner conveying nozzle 91 as a nozzle disposed in the apparatus body 100 in conjunction with a movement (i.e., the movement to the left in FIGS. 4, 5A, 5B, 5C, 6A, and 6B) of the toner container 32Y in the predetermined installation direction to the apparatus body 100. When the shutter 36 is pushed by the toner conveying nozzle 91, the toner conveying nozzle 91 is inserted into the toner container 32Y and communicates with the toner container 32Y via the opening 91*a* (i.e., the inlet port) formed on the circumferential surface of the toner conveying nozzle 91.

The rod 37 is integrated with the shutter 36 and extends in the insertion direction, which is one of the left-and-right directions in FIGS. 4, 8A, 8B, and 8C).

The compression spring 38 is wound around the rod 37 and urges the shutter 36 in a direction opposite to the insertion direction, which is a direction in which the through-hole portion 40*a* is closed and the left direction in FIGS. 4, 8A, 8B, and 8C).

The case 39 covers the circumference of the rod 37 and the compression spring 38 over the entire area in the insertion direction (or in the opening-and-closing directions). The case 39 has the opening portion 39*a* (refer to FIG. 7) at a part of the circumferential surface over the entire area in the insertion direction (opening-and-closing directions).

The seal holder 40 is a substantially cylindrical member that removably retains the seal 41 in the inner peripheral portion 40*b* (an internal cavity including the through-hole portion 40*a*), and also functions as a cap (head portion) of the toner container 32Y.

Figure 6A:
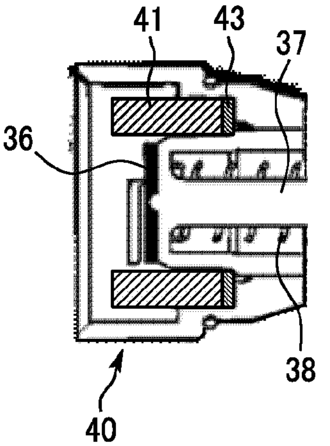
FIGS. 6A and 6B are schematic diagrams illustrating movement of a shutter in the toner container.
Figure 6B:
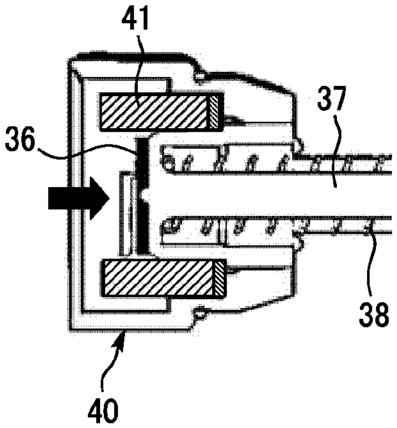
Figure 7:
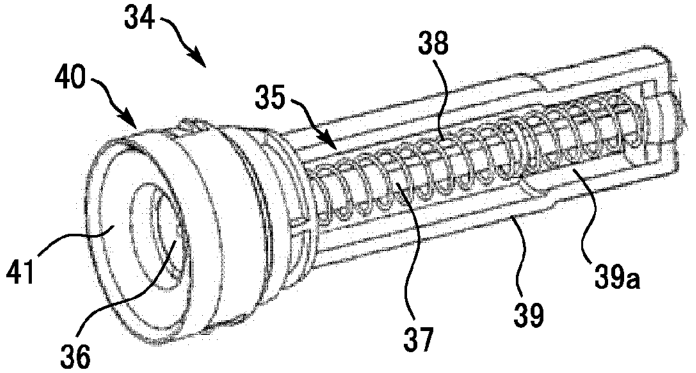
FIG. 7 is a perspective view of a shutter unit in the toner container of FIG. 4.

The seal 41 covers the circumferential surface of the shutter 36 in the closing state in which the shutter 36 is not pushed by the toner conveying nozzle 91 (i.e., nozzle), and slidingly contacts the circumferential surface of the shutter 36 and the circumferential surface of the toner conveying nozzle 91 in the opening operation in which the shutter 36 is pushed by the toner conveying nozzle 91. Specifically, in the present embodiment, as illustrated in FIGS. 6A and 6B, the seal 41 is adhered to an inner wall surface of the seal holder 40 via a double-sided tape 43.

In the present embodiment, the seal holder 40 is non-rotatably held by the apparatus body 100 (installation section 31).

Figure 8A:
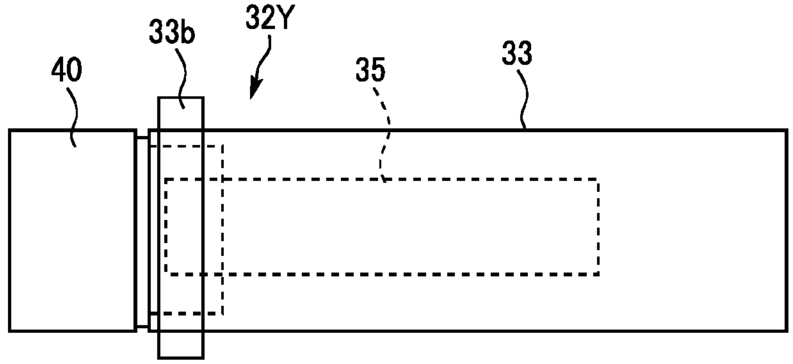
FIGS. 8A to 8C are schematic diagrams illustrating a process of disassembling a toner container.
Figure 8B:
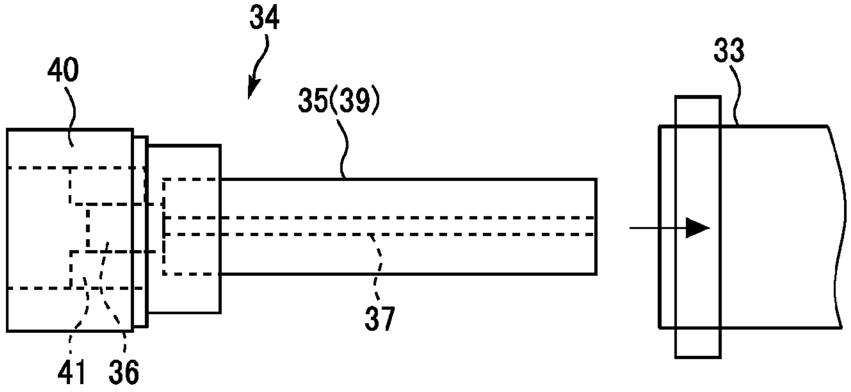
Figure 8C:
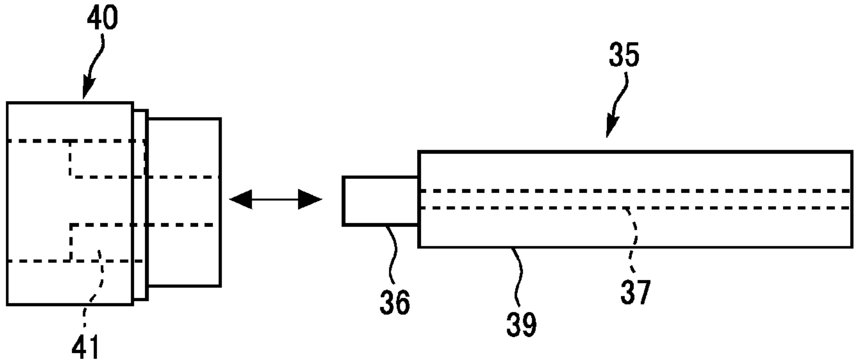

The container body 33 is a bottle to accommodate toner inside, and is fitted with the seal holder 40 with the shutter holder 35 inserted in the container body 33. In other words, as illustrated in FIGS. 8A and 8B, the container body 33 is attachable to and detachable from (connectable to and separable from) the shutter unit 34.

In the present embodiment, the container body 33 is rotatable with a rotation axis direction being an insertion direction (opening-and-closing directions) in the apparatus body 100. The container body 33 has a gear 33*b* an outer peripheral surface thereof. A rotation driving force is transmitted from the apparatus body 100 (the drive motor 115) to the gear 33*b*.

With reference to FIGS. 8A, 8B, and 8C, and 9, according to the present embodiment, the shutter holder 35 and the seal holder 40 are integrated in a detachable manner in the shutter unit 34.

In other words, each of the shutter holder 35 and the seal holder 40 is configured as a sub unit. The shutter holder 35 and the seal holder 40 are integrated to constitute the shutter unit 34. Furthermore, the container body 33 is integrated with the shutter unit 34 to constitute the toner container 32Y.

For example, as illustrated in FIG. 8B, the shutter unit 34 and the container body 33 can be separated (disassembled) from the toner container 32Y. Furthermore, the shutter holder 35 and the seal holder 40 can be separated (disassembled) from the shutter unit 34 illustrated in FIG. 8C.

Thus, the shutter unit 34 according to the present embodiment is configured to be disassembled into the shutter holder 35 and the seal holder 40, this allowing the seal 41 to be easily removed.

Specifically, in a case where the used toner container 32Y collected from the market is recycled (reused), the used seal 41 may have severe degradation such as abrasion compared to the other components, and may be difficult to reuse as it is. For this reason, during the recycling operation, it may be necessary to clean the shutter unit 34 from which the container body 33 is separated and to remove the existing seal 41 of the shutter unit 34 to replace the shutter unit 34 with an unused one.

At that time, if the shutter unit 34 is configured not to be disassembled into the shutter holder 35 and the seal holder 40, it may be necessary to perform an operation of pulling out the shutter 36 and the rod 37 from the shutter unit 34 and then an operation of inserting a finger into the opening portion 39*a* of the case 39 and the inner peripheral portion 40*b* and peeling off the seal 41, which may make the operation difficult. Furthermore, the operation of attaching the unused seal 41 to the seal holder 40 is also similarly performed by inserting a finger into the opening portion 39*a* of the case 39 and the inner peripheral portion 40*b*, which may make the operation difficult.

In the present embodiment, the shutter unit 34 is configured to be disassembled into the shutter holder 35 and the seal holder 40. Thus, an operation of inserting a finger into the through-hole portion 40*a* and the inner peripheral portion 40*b* exposed to the outside and peeling the seal 41 is performed on the seal holder 40 after the disassembly, which facilitates the operation. Furthermore, the operation of attaching the unused seal 41 to the seal holder 40 is also similarly performed by inserting a finger into the through-hole portion 40*a* and the inner peripheral portion 40*b*, which facilitates the operation.

Figure 9:
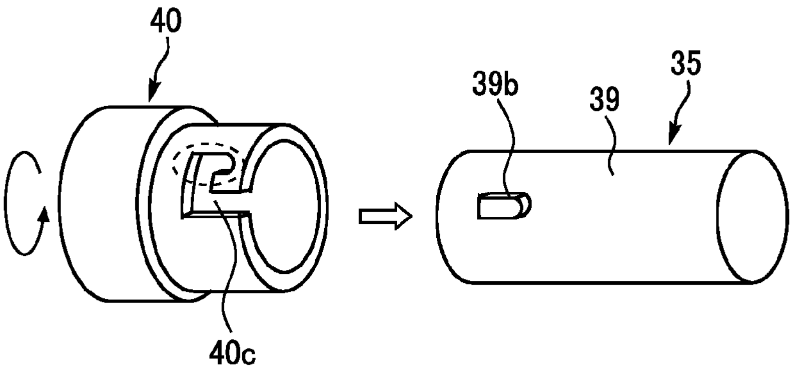
FIG. 9 is a schematic perspective view of a shutter unit in an assembling operation, according to an embodiment of the present disclosure.

With reference to FIG. 9, in the shutter unit 34 according to the present embodiment, the seal holder 40 is moved relative to the shutter holder 35 in the insertion direction (the direction indicated by a white arrow in FIG. 9) and then rotated in a predetermined rotation direction (the direction indicated by an arrow in FIG. 9) to engage a tab 39*b* as an engaging portion of the shutter holder 35 and a notch 40*c* as an engaged portion of the seal holder 40, thereby integrating the shutter holder 35 and the seal holder 40.

Specifically, in the shutter holder 35, the tab 39*b* (engaging portion) is formed to project on an outer peripheral surface of the case 39. On the other hand, in the seal holder 40, the substantially L-shaped notch 40*c* (a portion to be engaged) is formed in an outer peripheral surface on the side with which the shutter holder 35 is engaged. First, the seal holder 40 is moved relative to the shutter holder 35 in the direction indicated by the white arrow so that the tab 39*b* enters an opening portion of the notch 40*c*. After the tab 39*b* enters the opening portion of the notch 40*c*, the seal holder 40 is rotated in the direction indicated by the arrow in FIG. 9. Thus, while the tab 39*b* is elastically deformed, the tab 39*b* is fitted in a fit portion (a part surrounded by a broken line) of the notch 40*c*. As a result, the shutter holder 35 and the seal holder 40 are integrated and engaged with each other, and the assembly of the shutter unit 34 is completed.

When the shutter holder 35 and the seal holder 40 are separated from each other, a procedure opposite to the procedure for the above-described engagement is performed.

In the present embodiment, the rotation direction of the seal holder 40 described previously with reference to FIG. 9 (the rotation direction indicated by the arrow in FIG. 9 for engaging the notch 40*c* and the tab 39*b*) is configured to be opposite to the rotation direction of the container body 33 (the rotation direction of the container body 33 during toner supply described previously with reference to FIG. 3).

For example, in the case where the rotation direction of the container body 33 during toner supply is clockwise as viewed in the predetermined rotation axis direction (e.g., as viewed from the left side in FIG. 9), the rotation direction of the seal holder 40 during engagement is counterclockwise.

With such a configuration, the direction in which the container body 33 rotates during toner supply leads to an increase in the engagement of the seal holder 40 and the shutter holder 35. Thus, the configuration can prevent such a failure that the engagement of the seal holder 40 and the shutter holder 35 is released by the rotation of the container body 33 during toner supply.

In the present embodiment, the gear 33*b* (see FIGS. 3, 8A, 8B, and 8C) formed in the container body 33 is a helical gear, and is configured so that a component of the driving force transmitted from the apparatus body 100 (helical drive gear 110) in the insertion direction (axial direction) acts in the direction in which the shutter holder 35 and the seal holder 40 are engaged with each other (the direction in which the shutter holder 35 and the seal holder 40 approach each other and the container body 33 and the seal holder 40 are engaged with each other).

In the driving by the helical gear, a force component in the axial direction acts from the helical gear on the driving side to the helical gear on the driven side in addition to a force component in the rotational direction. In the present embodiment, the force component in the axial direction is directed not in a direction in which the shutter holder 35 (or the container body 33) and the seal holder 40 are separated from each other but in a direction in which the shutter holder 35 (or the container body 33) and the seal holder 40 approach each other, i.e., in a direction in which the shutter holder 35 (or the container body 33) are engaged with each other. Such a configuration can prevent such a failure that the engagement of the seal holder 40 (or the container body 33) and the shutter holder 35 is released by the rotation of the container body 33 during toner supply.

The force component in the axial direction which the helical gear 33*b* receives from the drive gear 110 is configured to be directed toward (acts on) the direction in which the toner container 32Y is inserted into the apparatus body 100 (installation section 31). Such a configuration can prevent such a failure that the toner container 32Y comes out of the apparatus body 100 (installation section 31) due to the rotation of the container body 33.

A description is given below of a first modification of the above-described embodiments of the present disclosure.

In a shutter unit 34 according to the first modification, a shutter holder 35 and a seal holder 40 are also integrated in a detachable manner.

Figure 10:
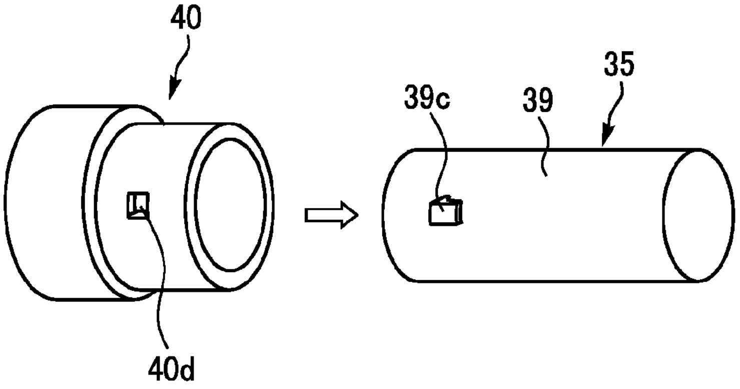
FIG. 10 is a perspective view of a shutter unit in an assembling operation, according to a first modification of the embodiment of FIG. 9.

As illustrated in FIG. 10, in the shutter unit 34 according to the first modification, the seal holder 40 is moved relative to the shutter holder 35 in the insertion direction (a direction indicated by a white arrow in FIG. 10), and a claw 39*c* as an engaging portion of the shutter holder 35 and a hole 40*d* as an engaged portion of the seal holder 40 are engaged with each other. Thus, the shutter holder 35 and the seal holder 40 are integrated as a unit.

Specifically, in the shutter holder 35, the claw 39*c* (engaging portion) is formed to protrude on an outer peripheral surface of a case 39. On the other hand, in the seal holder 40, the hole 40*d* (a portion to be engaged) is formed on an outer peripheral surface on the side with which the shutter holder 35 is engaged. The seal holder 40 is moved relative to the shutter holder 35 in the direction indicated by the white arrow so that the claw 39*c* enters the hole 40*d*. As a result, the shutter holder 35 and the seal holder 40 are integrated and engaged with each other, and the assembly of the shutter unit 34 is completed.

When the shutter holder 35 and the seal holder 40 are separated from each other, a procedure opposite to the procedure for the above-described engagement is performed.

Such a configuration also allows the seal 41 to be easily removed from the shutter unit 34 in the toner container 32Y. In the first modification, in particular, the shutter holder 35 and the seal holder 40 are engaged with each other in a non-rotatable manner. Thus, such a failure that the engagement of the shutter holder 35 and the seal holder 40 is released by the rotation of the container body 33 is unlikely to occur. Furthermore, since the shutter holder 35 and the seal holder 40 are engaged with each other in one action (only linear movement) in the first modification example, the assembly operation is easier than in a case where the shutter holder 35 and the seal holder 40 are engaged with each other in two actions (linear movement and rotation) as in the case of FIG. 9.

A description is given below of a second modification of the above-described embodiments of the present disclosure.

In a shutter unit 34 according to the second modification, a shutter holder 35 and a seal holder 40 are also integrated in a detachable manner.

Figure 11:
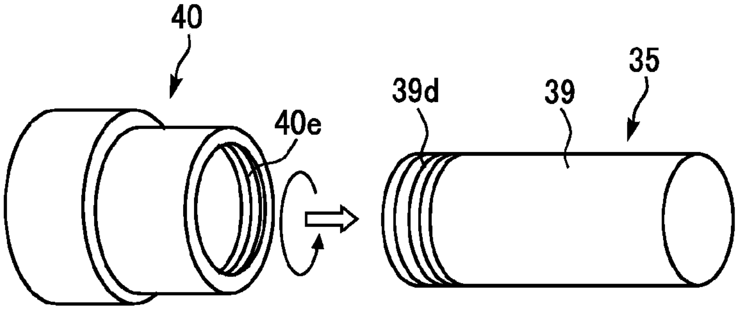
FIG. 11 is a perspective view of a shutter unit in an assembling operation, according to a second modification of the embodiment of FIG. 9.

As illustrated in FIG. 11, in the shutter unit 34 according to the second modification, the seal holder 40 is moved in the insertion direction while being rotated in a predetermined rotation direction relative to the shutter holder 35 (while being rotated in the direction indicated by the arrow in FIG. 11). As a result, a male screw portion 39*d* of the shutter holder 35 and a female screw portion 40*e* of the seal holder 40 are screwed together. Thus, the shutter holder 35 and the seal holder 40 are integrated as a unit.

Specifically, in the shutter holder 35, the male screw portion 39*d* is formed on an outer peripheral surface of a case 39 (an outer peripheral surface on the side with which the seal holder 40 is engaged). On the other hand, in the seal holder 40, the female screw portion 40*e* is formed on an inner peripheral surface on the side with which the shutter holder 35 is engaged. The seal holder 40 is rotated and moved relative to the shutter holder 35 such that the male screw portion 39*d* screws into the female screw portion 40*e*. As a result, the shutter holder 35 and the seal holder 40 are integrated and engaged with each other, and the assembly of the shutter unit 34 is completed.

When the shutter holder 35 and the seal holder 40 are separated from each other, a procedure opposite to the procedure for the above-described engagement is performed.

Such a configuration also allows the seal 41 to be easily removed from the shutter unit 34 in the toner container 32Y.

Also in the second modification, similarly to the case of FIG. 9, a rotation direction (screw rotation direction) of the seal holder 40 and the shutter holder 35 during engagement is configured to be opposite to a rotation direction of the container body 33 during toner supply. Such a configuration prevents such a failure that the engagement of the seal holder 40 and the shutter holder 35 is released by the rotation of the container body 33 during toner supply.

Also in the second modification, similarly to FIG. 9, a component in the insertion direction (axis direction) of a driving force transmitted from the drive gear 110 to a helical gear 33*b* of the container body 33 acts in a direction in which the shutter holder 35 and the seal holder 40 are engaged with each other (a direction in which the shutter holder 35 and the seal holder 40 approach each other and the container body 33 and the seal holder 40 are engaged with each other). Such a configuration can prevent such a failure that the engagement of the seal holder 40 (or the container body 33) and the shutter holder 35 is released by the rotation of the container body 33 during toner supply.

The force component in the axial direction which the helical gear 33*b* receives from the drive gear 110 is configured to be directed toward the direction in which the toner container 32Y is inserted into the apparatus body 100 (installation section 31). Such a configuration can prevent such a failure that the toner container 32Y comes out of the apparatus body 100 (installation section 31) due to the rotation of the container body 33.

A description is given below of a third modification of the above-described embodiments of the present disclosure.

The toner container 32Y according to the third modification is different from those illustrated in FIGS. 3 to 9 in that a container body 33 is configured to be rotatable with a shutter unit 34 with an insertion direction (opening-and-closing directions and left-and-right directions in FIG. 3) as a rotation axis in the apparatus body 100.

In other words, the toner container 32Y in the third modification is configured such that the toner container 32Y itself rotates as a whole with the toner conveying nozzle 91 of the apparatus body 100 inserted.

Figure 12A:
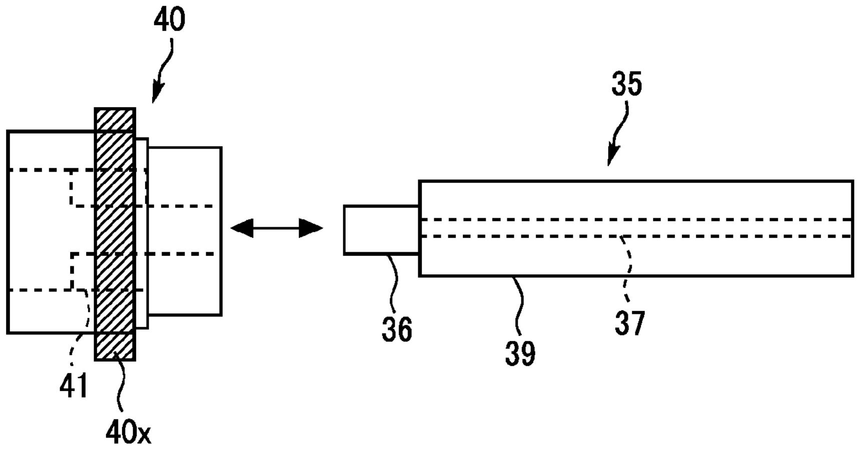
FIGS. 12A and 12B are schematic exploded views of a shutter unit in an assembling operation, according to a third modification of the embodiment of FIG. 9.
Figure 12B:
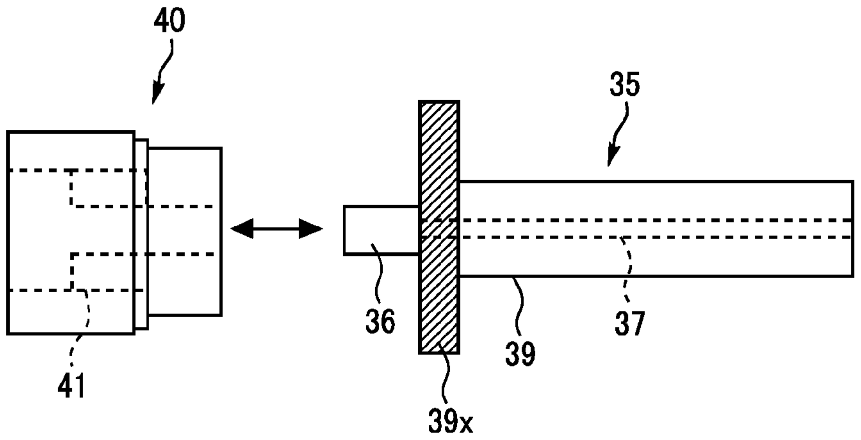

Accordingly, as a gear to which drive (rotational drive) is transmitted from the apparatus body 100 (drive motor 115), as illustrated in FIG. 12A, a gear 40*x* may be formed on the outer peripheral surface of the seal holder 40 of the shutter unit 34, instead of forming a gear 33*b* on the outer peripheral surface of the container body 33. Alternatively, as illustrated in FIG. 12B, a gear 39*x* may be formed on the outer peripheral surface of the shutter holder 35 of the shutter unit 34.

In the case where the gear 40*x* or 39*x* is formed in the seal holder 40 and the shutter holder 35 in such a manner, the gear 40*x* or 39*x* is formed as a helical gear so that a component in the insertion direction (axial direction) of the driving force transmitted from the apparatus body 100 (drive gear 110) is configured to act in the direction in which the shutter holder 35 and the seal holder 40 are engaged with (approach) each other. Such a configuration prevents such a failure that the engagement of the seal holder 40 and the shutter holder 35 is released by the rotation of the toner container 32Y during toner supply.

The force component in the axial direction which the helical gear 39*x* or 40*x* receives from the drive gear 110 is configured to be directed toward the direction in which the toner container 32Y is inserted into the apparatus body 100 (installation section 31). Such a configuration can prevent such a failure that the toner container 32Y comes out of the apparatus body 100 (installation section 31) due to the rotation of the toner container 32Y (the shutter unit 34).

As described above, the shutter unit 34 according to the present embodiment is a shutter unit installed in the toner container 32Y that can be attached to and detached from the apparatus body 100. The shutter unit 34 includes the shutter 36 that is pushed by the nozzle 91 (toner conveying nozzle) installed in the apparatus body 100 in conjunction with the movement of the toner container 32Y in the predetermined insertion direction into the apparatus body 100 to insert the nozzle 91 into the toner container 32Y and communicate the nozzle 91 and the toner container 32Y via the opening 91*a* formed on the circumferential surface of the nozzle 91. The shutter unit 34 includes the seal 41 to cover the circumferential surface of the shutter 36 in a closed state in which the shutter 36 is not pressed by the nozzle 91 and to slidingly contact the circumferential surface of the shutter 36 and the circumferential surface of the nozzle 91 in an opening operation in which the shutter 36 is pressed by the nozzle 91. The shutter unit 34 also includes the shutter holder 35 that holds the shutter 36 such that the shutter 36 is movable in the insertion direction and the seal holder 40 that detachably holds the seal 41 at an inner peripheral portion of the seal holder 40. The shutter holder 35 and the seal holder 40 are integrated in such a manner in which shutter holder 35 and the seal holder 40 can be disassembled.

Thus, the seal 41 can be easily removed from the shutter unit 34 on the toner container 32Y.

In the above-described embodiments, the shutter unit 34 is installed in the toner container 32Y that stores toner (a one-component developer). However, an object to be stored in the toner container is not limited to the toner (a one-component developer). For example, in some embodiments of the present disclosure, a shutter unit may be disposed in a toner container that stores a two-component developer.

Even such a case exhibits substantially the same advantages as the advantages of the above-described embodiments.

The above-described embodiments and modifications are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. The number, position, and shape of the components described above are not limited to those embodiments described above. Desirable number, position, and shape can be determined to perform the present disclosure.

Aspects of the present disclosure may be, for example, as follows.

First Aspect

A shutter unit, which is installed in a toner container that is attachable to and detachable from an apparatus body of an image forming apparatus, includes: a shutter to be pushed by a nozzle disposed in the body of the image forming apparatus, in conjunction with movement of the toner container in a predetermined insertion direction into the body of the image forming apparatus, to insert the nozzle into the toner container and to cause the nozzle and the toner container to communicate with each other via an opening formed on a circumferential surface of the nozzle; a shutter holder that holds the shutter movable in the insertion direction; a seal to contact a circumferential surface of the shutter in a closed state in which the seal is not pressed by the nozzle, the seal to slide on a circumferential surface of the shutter and a circumferential surface of the nozzle during an opening operation in which the shutter is pressed by the nozzle; and a seal holder to detachably hold the seal at an inner portion of the seal holder, wherein the shutter holder and the seal holder are integrated in a detachable manner.

Second Aspect

In the shutter unit according to the first aspect, the seal holder is moved relative to the shutter holder in the insertion direction and then rotated in a predetermined rotation direction to cause an engaging portion of the shutter holder and an engaged portion of the seal holder to engage with each other, to integrate the shutter holder and the seal holder.

Third Aspect

In the shutter unit according to the first aspect, the seal holder is moved in the insertion direction while the seal holder is rotated in a predetermined rotation direction relative to the shutter holder, to screw a male screw portion of the shutter holder and a female screw portion of the seal holder together to integrate the shutter holder and the seal holder.

Fourth Aspect

In the shutter unit according to the second or third aspect, a container body that is rotatable about a rotation axis that is the insertion direction in the body of the image forming apparatus is configured to be engaged with the seal holder with the shutter holder inserted in the container body. The predetermined rotation direction of the seal holder is opposite to a rotation direction of the container body.

Fifth Aspect

In the shutter unit according to the first aspect, the seal holder is moved relative to the shutter holder in the insertion direction to cause an engaging portion of the shutter holder and an engaged portion of the seal holder to engage with each other, to integrate the shutter holder and the seal holder.

Sixth Aspect

In the shutter unit according to any one of the first to fifth aspects, the shutter holder includes a rod integrated with the shutter and extending in the insertion direction; a compression spring wound around the rod to urge the shutter in a direction opposite to the insertion direction; and a case to cover a circumference of the rod and the compression spring across the rod and the compression spring in the insertion direction, the case having an opening portion at a part of a circumferential surface of the case across the case in the insertion direction.

Seventh Aspect

A toner container includes the shutter unit according to any one of the first to sixth aspects and is detachably attached to the body of the image forming apparatus. The toner container includes a container body to store toner inside. The container body is engaged with the seal holder with the shutter holder inserted in the container body.

Eighth Aspect

In the toner container according to the seventh aspect, the seal holder is non-rotatably held by the body of the image forming apparatus. The container body is configured to be rotatable in the body of the image forming apparatus with the insertion direction as a rotation axis. The container body has a gear on an outer peripheral surface of the container body. Rotational drive is transmitted from the body of the image forming apparatus to the gear.

Ninth Aspect

In the toner container according to the seventh aspect, the container body is configured to be rotatable together with the shutter unit, with the insertion direction as a rotation axis, in the body of the image forming apparatus. One of the seal holder and the shutter holder has a gear on an outer peripheral surface of the one of the seal holder and the shutter holder. Rotational drive is transmitted from the body of the image forming apparatus to the gear.

Tenth Aspect

In the toner container according to the eighth or ninth aspect, the gear is a helical gear, and a component of driving force transmitted from the body of the image forming apparatus in the insertion direction acts in a direction in which the shutter holder and the seal holder are engaged with each other.

Eleventh Aspect

An image forming apparatus includes the toner container according to any one of the seventh to tenth aspects. The toner container is detachably attached to the body of the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

CROSS-REFERENCE TO RELATED APPLICATIONS

This patent application is based on International Application No. PCT/IB2023/055262, filed on May 23, 2023, which claims priority to Japanese Patent Application No. 2022-087286, filed on May 28, 2022, in the Japan Patent Office, the entire disclosure of which is each are hereby incorporated by reference herein.

REFERENCE SIGNS LIST

Description of Reference Code

5Y Developing device (Unit to be supplied)
32Y, 32M, 32C, and 32K Toner containers (Powder container)
33 Container body
34 Shutter unit (Nozzle receiver)
35 Shutter holder
36 Shutter
37 Rod
38 Compression spring
39 Case
39*a* Opening portion
39*b* Tab (Engaging portion)
39*c* Claw (Engaging portion)
39*d* Male screw portion
40 Seal holder
40*a* Through-hole portion
40*c* Notch (Engaged portion)
40*d* Hole (Engaged portion)
40*e* Female screw portion
41 Seal
90 Toner supply device (Supply device)
91 Toner conveying nozzle (Nozzle)
91*a* Opening
1000 Image forming apparatus
100 Apparatus body

The invention claimed is:

1. A shutter unit to be installed in a toner container, the shutter unit comprising:

a shutter to be pushed by a nozzle, in conjunction with movement of the toner container in an insertion direction, to insert the nozzle into the toner container and to communicate the nozzle and the toner container with each other via an opening on a circumferential surface of the nozzle;

a shutter holder that holds the shutter movable in the insertion direction;

a seal to contact a circumferential surface of the shutter in a closed state in which the seal is not pressed by the nozzle, the seal to slide on the circumferential surface of the shutter and the circumferential surface of the nozzle during an opening operation in which the shutter is pressed by the nozzle; and a seal holder to detachably hold the seal at an inner portion of the seal holder, wherein:

the shutter holder and the seal holder are integrated, the shutter holder and the seal holder are detachable from each other, and the seal holder is to move relative to the shutter holder in the insertion direction and rotate in a predetermined rotation direction to engage an engaging portion of the shutter holder and an engaged portion of the seal holder with each other, to integrate the shutter holder and the seal holder.

2. The shutter unit according to claim 1, wherein:

the seal holder is to engage with a container body that is rotatable about a rotation axis that is the insertion direction, with the shutter holder inserted in the container body, and the predetermined rotation direction of the seal holder is opposite to a rotation direction of the container body.

3. The shutter unit according to claim 1, wherein:

the shutter unit is to be attached to a container body which rotates in a rotation direction, the container body further includes a spiral projection on an inner peripheral surface of the container body and contains a powder in the container body, the rotation direction of the container body is a rotation direction to convey the powder toward the shutter in a longitudinal direction of the container body.

4. The shutter unit according to claim 1, wherein the shutter holder includes:

a rod integrated with the shutter and extending in the insertion direction;

a compression spring wound around the rod to urge the shutter in a direction opposite to the insertion direction; and a case to cover a circumference of the rod and the compression spring across the rod and the compression spring in the insertion direction, the case having an opening portion at a part of a circumferential surface of the case across an area in the insertion direction.

5. The toner container, comprising the shutter unit according to claim 1, wherein:

the toner container is detachably attached to an apparatus body and includes a container body to store toner inside the container body, and the container body is engaged with the seal holder with the shutter holder inserted in the container body.

6. The toner container according to claim 1, wherein:

the seal holder is non-rotatably held by an apparatus body of an image forming apparatus, the container body is to rotate around a rotation axis parallel to the insertion direction in the apparatus body, and the container body has a gear on an outer peripheral surface of the container body such that rotational drive is transmitted from the apparatus body to the gear.

7. An image forming apparatus, comprising the toner container according to claim 1, wherein:

the toner container is detachably attached to an apparatus body of the image forming apparatus.

8. A shutter unit to be installed in a toner container, the shutter unit comprising:

a shutter to be pushed by a nozzle, in conjunction with movement of the toner container in an insertion direction, to insert the nozzle into the toner container and to communicate the nozzle and the toner container with each other via an opening on a circumferential surface of the nozzle;

a shutter holder that holds the shutter movable in the insertion direction;

a seal to contact a circumferential surface of the shutter in a closed state in which the seal is not pressed by the nozzle, the seal to slide on the circumferential surface of the shutter and the circumferential surface of the nozzle during an opening operation in which the shutter is pressed by the nozzle; and a seal holder to detachably hold the seal at an inner portion of the seal holder, wherein:

the shutter holder and the seal holder are integrated, the shutter holder and the seal holder are detachable from each other, and the seal holder is to move in the insertion direction while the seal holder rotates in a predetermined rotation direction relative to the shutter holder, to screw a male screw portion of the shutter holder and a female screw portion of the seal holder together to integrate the shutter holder and the seal holder.

9. The shutter unit according to claim 8, wherein:

the seal holder is to engage with a container body that is rotatable about a rotation axis that is the insertion direction, with the shutter holder inserted in the container body, and the predetermined rotation direction of the seal holder is opposite to a rotation direction of the container body.

10. The shutter unit according to claim 8, wherein:

the shutter unit is to be attached to a container body which rotates in a rotation direction, the container body further includes a spiral projection on an inner peripheral surface of the container body and contains a powder in the container body, the rotation direction of the container body is a rotation direction to convey the powder toward the shutter in a longitudinal direction of the container body.

11. The shutter unit according to claim 8, wherein the shutter holder includes:

a rod integrated with the shutter and extending in the insertion direction;

a compression spring wound around the rod to urge the shutter in a direction opposite to the insertion direction; and a case to cover a circumference of the rod and the compression spring across the rod and the compression spring in the insertion direction, the case having an opening portion at a part of a circumferential surface of the case across an area in the insertion direction.

12. The toner container, comprising the shutter unit according to claim 8, wherein:

the toner container is detachably attached to an apparatus body and includes a container body to store toner inside the container body, and the container body is engaged with the seal holder with the shutter holder inserted in the container body.

13. The toner container according to claim 8, wherein:

the shutter unit is to be attached to a container body which rotates in a rotation direction, the seal holder is non-rotatably held by an apparatus body of an image forming apparatus, the container body is to rotate around a rotation axis parallel to the insertion direction in the apparatus body, and the container body has a gear on an outer peripheral surface of the container body such that rotational drive is transmitted from the apparatus body to the gear.

14. An image forming apparatus, comprising the toner container according to claim 8, wherein:

the toner container is detachably attached to the apparatus body of the image forming apparatus.

15. A shutter unit to be installed in a toner container, the shutter unit comprising:

a shutter to be pushed by a nozzle, in conjunction with movement of the toner container in an insertion direction, to insert the nozzle into the toner container and to communicate the nozzle and the toner container with each other via an opening on a circumferential surface of the nozzle;

a shutter holder that holds the shutter movable in the insertion direction;

a seal to contact a circumferential surface of the shutter in a closed state in which the seal is not pressed by the nozzle, the seal to slide on the circumferential surface of the shutter and the circumferential surface of the nozzle during an opening operation in which the shutter is pressed by the nozzle; and a seal holder to detachably hold the seal at an inner portion of the seal holder, wherein:

the shutter holder and the seal holder are integrated, the shutter holder and the seal holder are detachable from each other, and the seal holder is to move relative to the shutter holder in the insertion direction to engage an engaging portion of the shutter holder and an engaged portion of the seal holder with each other, to integrate the shutter holder and the seal holder.

16. The shutter unit according to claim 15, wherein:

the shutter unit is to be attached to a container body which rotates in a rotation direction, the container body further includes a spiral projection on an inner peripheral surface of the container body and contains a powder in the container body, the rotation direction of the container body is a rotation direction to convey the powder toward the shutter in a longitudinal direction of the container body.

17. The shutter unit according to claim 15, wherein the shutter holder includes:

a rod integrated with the shutter and extending in the insertion direction;

a compression spring wound around the rod to urge the shutter in a direction opposite to the insertion direction; and a case to cover a circumference of the rod and the compression spring across the rod and the compression spring in the insertion direction, the case having an opening portion at a part of a circumferential surface of the case across an area in the insertion direction.

18. The toner container, comprising the shutter unit according to claim 15, wherein:

the toner container is detachably attached to an apparatus body and includes a container body to store toner inside the container body, and the container body is engaged with the seal holder with the shutter holder inserted in the container body.

19. The toner container according to claim 15, wherein:

the shutter unit is to be attached to a container body which rotates in a rotation direction, the seal holder is non-rotatably held by the apparatus body of an image forming apparatus, the container body is to rotate around a rotation axis parallel to the insertion direction in the apparatus body, and the container body has a gear on an outer peripheral surface of the container body such that rotational drive is transmitted from the apparatus body to the gear.

20. An image forming apparatus, comprising the toner container according to claim 15, wherein:

the toner container is detachably attached to the apparatus body of the image forming apparatus.

* * * * *